Feb. 8, 1944. E. BAGNALL 2,340,858
STABILIZER
Filed Oct. 29, 1941
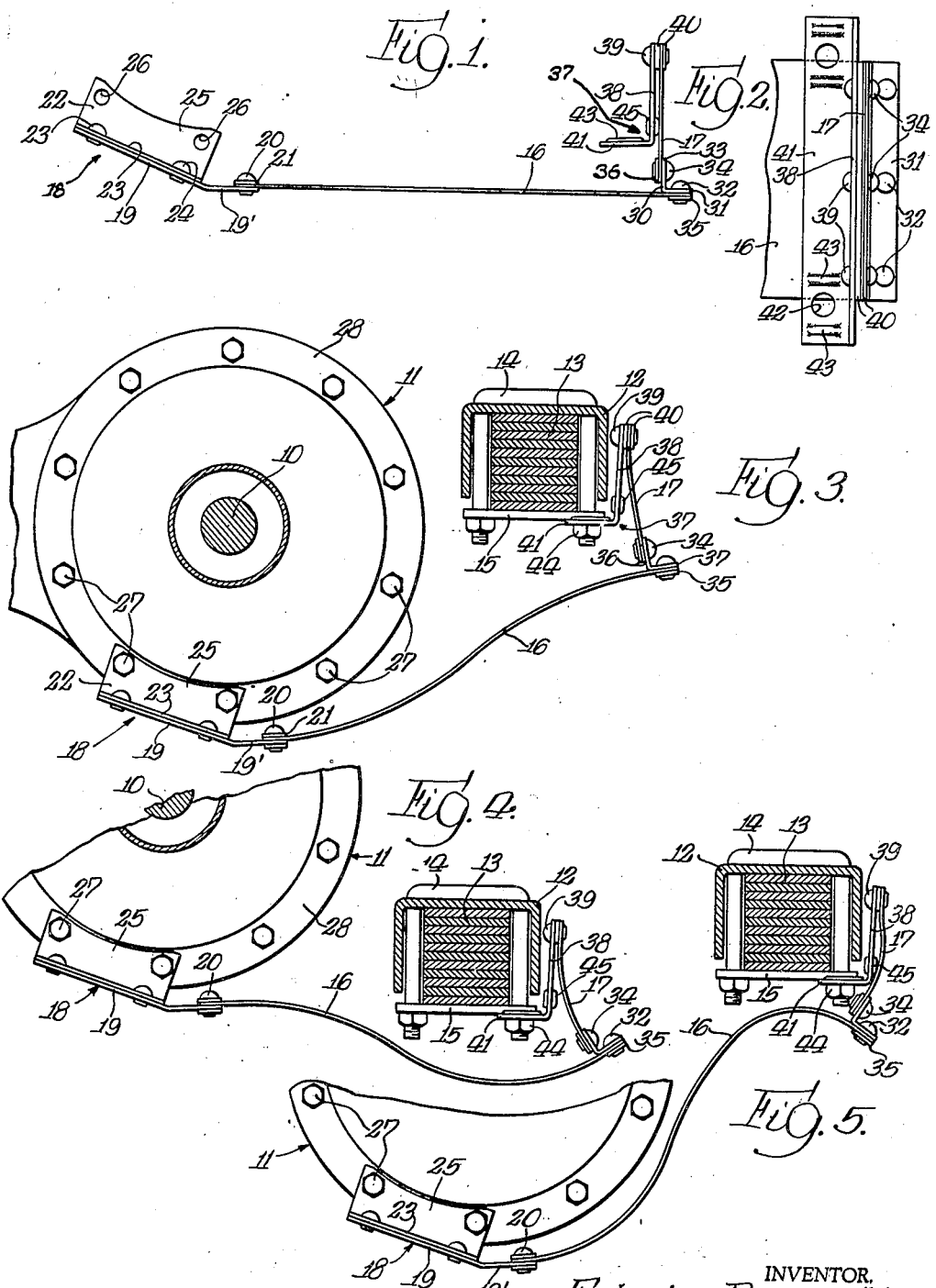
INVENTOR.
Edwin Bagnall
BY Emmet A. Wegner atty.

Patented Feb. 8, 1944

2,340,858

UNITED STATES PATENT OFFICE 2,340,858

STABILIZER

Edwin Bagnall, Chicago, Ill.

Application October 29, 1941, Serial No. 416,946

19 Claims. (Cl. 267—67)

The invention relates generally to a stabilizer for a spring supported body and more particularly to a stabilizer for vehicles, being generally of the type disclosed and claimed in my copending application Serial No. 364,509, filed November 6, 1940.

Present trends in the design of vehicles, whether railroad cars, trolley cars, or automobiles, is toward a softer ride derived by the employment of softer springs. With the springs softer they will, of course, have a greater deflection under load and also will have a greater recoil unless properly restrained by shock absorbers. Even hard springs may have a very great recoil if no shock absorbers are present, or if they are not properly adjusted.

This large deflection under load and this possibility of large recoil presents many difficult problems in the application of a stabilizer to such a vehicle. Provision must be made to permit such large deflection and recoil without undue strain on the stabilizer or the parts of the vehicle undercarriage or body to which the stabilizer is attached, while at the same time care must be exercised that the stabilizer does not reduce road clearance, particularly during deflection of the spring under load. Present day transverse rod stabilizers, which have never proved adequate to effect stabilization, are wholly incapable of construction in a manner permitting of such extreme deflection and recoil and have in some installations actually been known to break off the fittings to which they are attached.

One object of this invention, therefore, is to provide a stabilizer of new and improved construction and particularly adapted for employment on vehicles or other spring supported bodies where the movement between the parts separated by the springs is unusually large.

Another object of the invention is to provide a stabilizer of such construction as will permit full deflection of the spring means under load and maximum recoil thereof without injurious strain upon the stabilizer or the parts to which it is attached.

Another object is to provide a stabilizer of such construction that during recoil of the spring means in the structure with which the stabilizer is associated excessive or sharp bending stresses in the parts of the stabilizer are prevented.

Another object is to provide a stabilizer composed of a pair of rigidly interconnected and rigidly attached leaf elements so disposed with respect to one another that during recoil of the spring means in the structure with which the stabilizer is associated the stresses will be generally longitudinally of the elements with any bending stresses distributed about gentle curves in the elements.

Another object is to provide a stabilizer composed of a pair of rigidly interconnected and rigidly attached leaf elements having attaching means for the remaining end of one of the elements permitting the last mentioned element to be designed with a greater or shorter length to provide the necessary length to accommodate recoil of the spring means in the vehicle with which the stabilizer is associated and the necessary road clearance on loading of the spring means.

Another object is to provide a stabilizer composed of a pair of rigidly interconnected leaf elements disposed generally normal to one another in unattached position and having attaching means for the remaining end of the one of the elements to be secured to the body of the vehicle capable of variation in proportion so as to vary the effective point of attachment of the end of the last mentioned element enabling the length thereof to be proportioned to provide the necessary freedom during recoil of the spring without reducing road clearance during loading of the spring.

Other objects and advantages will become apparent from the following detailed description taken in connection with the accompanying drawing, in which:

Fig. 1 is a side elevational view of a stabilizer embodying the features of this invention. The stabilizer is shown in its unapplied condition.

Fig. 2 is a fragmentary top plan view of the right hand end only of the stabilizer as viewed in Fig. 1.

Fig. 3 is a side elevational view illustrating the stabilizer applied to a vehicle with the spring in normal or static position.

Fig. 4 is a side elevational view showing the stabilizer with the vehicle spring in fully loaded and deflected position.

Fig. 5 is a view similar to Figs. 3 and 4 but showing the stabilizer with the spring recoiled.

As above stated generally, the stabilizer of this invention is applicable to a variety of spring supported bodies, but finds its primary application to vehicles of all kinds having bodies spring supported on an undercarriage structure. The problem of lateral stabilization of such vehicles and the added difficulties introduced by the employment of soft springs are generally the same, though the type of spring suspension and the body or undercarriage structure may vary in detail. Necessarily disclosure of the stabilizer must be made in some particular environment and will so be made hereinafter. It is not intended, however, that the invention is to be limited to the specific construction disclosed, nor even to use on a vehicle. On the contrary it is intended to cover all uses or adaptations and all modifications or alternative constructions falling within the scope or spirit of the invention as defined in the appended claims.

For exemplary purposes, the stabilizer is herein disclosed as applied to a vehicle the undercarriage of which includes an axle 10 and a gear housing 11 which is generally circular and disposed at right angles to the axle 10. The body or chassis frame structure includes a transverse member 12 spaced longitudinally of the vehicle with respect to the axle 10 and housing 11, and in the normal or static position of the chassis frame structure is disposed slightly above the axle 10, all as best seen in Fig. 3. Certain automotive vehicles, for example, the Fords, Mercuries, and so forth, utilize the member 12 as a partial housing for a transverse spring 13 which is secured to and within the member by U-bolts 14 and the conventional clip bar 15. The stabilizer will hereinafter be described as applied to this general kind of undercarriage and chassis frame structure.

The stabilizer comprises a pair of leaf or sheet-like elements 16 and 17 rigidly interconnected at one of their ends and intended to be rigidly attached at the remaining ends one to the undercarriage and the other to the chassis frame structure. The elements 16 and 17 are of a high quality, resilient metal, preferably spring steel, and each is made relatively thin so as to be readily flexible in a direction normal to its plane. At the same time, each element is made comparatively wide so as to offer tremendous resistance to bending moments in the plane of the element. By way of example, the thickness of the elements may be in the order of one-thirty-second of an inch, while the width of the elements herein shown is in the order of six inches.

The elements are, as stated, rigidly interconnected and rigidly attached, flexibility in a certain direction and a free point being designed into the stabilizer to make such rigid interconnection and attachment possible. The elements are, moreover, disposed with their width extending transversely of the vehicle, that is, flatwise rather than on edge and the stabilizer as a whole extending longitudinally so that, as interconnected and applied, the stabilizer is effective to prevent relative movement between the body and undercarriage in a direction transversely of the vehicle as more particularly disclosed and explained in my above mentioned copending application Serial No. 364,509.

When applied, the stabilizer as a whole extends longitudinally of the vehicle with one of the elements attached to the undercarriage structure. Herein the element 16 is constructed for such attachment. To facilitate attachment of the stabilizer, either as an accessory or as standard equipment, the attaching means is designed to take advantage of and cooperate with the structures as normally found in the vehicles. Accordingly, the element 16 is adapted for attachment to the gear housing 11 and to that end has rigidly secured to the end thereof an attaching means, generally designated 18. This means comprises a rigid base plate 19 having a portion 19' bent slightly out of the plane of the plate 19, as seen clearly in Fig. 1. This portion 19' is equal in width to the width of the element 16 and is rigidly secured thereto by a plurality of rivets 20. Interposed between the rivets and the element 16 is a narrow reinforcing strip 21 provided to afford a frictional connection taking a portion of the shear load which would otherwise have to be carried entirely by the rivets 20. Secured to the base plate 19 at each side thereof is a bracket 22 having a base flange 23 secured to the plate 19 by rivets 24 and an upstanding flange 25 formed with apertures 26 so spaced as to receive the bolts 27 retaining the end plate 28 of the gear housing 11. It is to be understood, of course, that the spacing of the brackets 22 is such that the gear housing will just be received therebetween. The element 16 preferably has a length somewhat greater than the distance between the axle 10 and the far leg of the U-bolt 14.

As previously stated, the employment of soft springs provides many obstacles to be overcome in the design of a suitable stabilizer because of the wide extent of movement between the fully deflected position of the spring under load and the fully recoiled position. Also contributing to the problem is the trend in design toward a constantly lower center of gravity of the vehicle necessitating a constantly lower position of the spring. Thus, as seen in Fig. 3, the lower portion of the spring even in the normal condition thereof is substantially at the level of the center line of the axle 10, while the ends of the U-bolts 14 even extend therebelow. Under load the springs are deflected to the position shown in Fig. 4, that is, even projecting partially below the housing 11. With deflection of the spring to the point shown in Fig. 4, the stabilizer must be given a unique design in order that it may not further reduce the road clearance. Accordingly, the stabilizer is herein given a unique construction of a character such that under full load or full deflection of the spring the stabilizer will not materially reduce the road clearance, yet on recoil there are no excessive stresses created either in the stabilizer or the parts to which it is attached.

To that end, the element 17 is disposed transversely of and generally normal to the element 16. As here shown in Fig. 1, the element 17, in the unapplied condition of the stabilizer, is directly normal to the element 16 but such precise right angular relationship is not critical. The element 17 remains generally normal to the element 16 in the normal applied condition of the stabilizer (Fig. 3) and even in the loaded and recoiled position (see Figs. 4 and 5), though in those positions both elements are flexed to a substantial degree. While the elements 16 and 17 might be formed from a single piece bent at right angles, they preferably are separate pieces secured together in this right angular or normal relationship by means of an angle iron or bar 30 having a first flange 31 secured by rivets 32 to the end of the element 16 and a second flange 33 secured by rivets 34 to the lower end of the element 17. Reinforcing strips 35 and 36 are provided in both instances, in order again to provide a frictional connection taking a portion of the shear load which would otherwise have to be carried entirely by the rivets 32 or 34. This transverse and generally normal relationship of the element 17 to the element 16 is advantageous aside from its primary purpose presently to be described. This additional advantage resides in the fact that the element 17 acts as a strut bracing the element 16.

In vehicles having a transverse spring 13 and inverted U-bolts 14 for securing the spring to the chassis frame structure, the U-bolts, of course, provide a logical point of attachment for the element 17 to the chassis frame structure. In order to utilize this natural and convenient point of attachment for the element 17 and at the same time permit variation in the length given to the element 17, for purposes which will later become apparent, a novel attaching means, generally designated 37, is provided. This means comprises a rigid main portion 38 rigidly secured at its end as by rivets 39 to the end of the element 17 and extending inwardly toward the element 16. Here reinforcing strips 40 are provided both on the outside of the element 17 and between the element 17 and the portion 38 to provide the usual frictional connection and also in order that one of the reinforcing strips may serve to space the element 17 slightly from the main portion 38 of the attaching means, as best seen in Fig. 1. At its inner end the main portion 38 of the clamping means has a base or attaching flange 41 (see Fig. 1) provided with apertures 42 near each end for receiving the outer or rear leg of the pair of U-bolts 14 commonly provided. Flanking each aperture 42 are a pair of ribs or beads 43 extending transversely of the flange 41 and so spaced as to receive snugly therebetween clip bar 15. With the beads 43 thus straddling the clip bars 15 and the nuts 44 on the ends of the legs of the U-bolts screwed tightly into position, the attaching means 37 is, of course, very rigidly held particularly against any movement in the plane of the flange 41.

Thus, though the actual attachment of the stabilizer is made to the chassis frame structure at a logical and already present point, the effective point of attachment of the element 17 is one that may be varied to permit making the element 17 of the desired and necessary length for the proper functioning of the stabilizer. This attaching means also aids in producing certain desirable operation of the element 17, as will later become apparent. In the construction herein disclosed, the element 17 is substantially shorter than the element 16 and will in most instances continue to be substantially shorter than the element 16. Though the element 17 is shorter than the element 16, it should be and herein is made of sufficient length to provide an effective free point in the stabilizer to compensate for the shortening and elongation of the distance between the point of attachment to the undercarriage and the point of attachment to the chassis frame structure during flexing and recoil of the springs and at the same time provide sufficient flexibility so that such movement of the free point of the stabilizer may be accomplished without the setting up of undue stresses and with a proper distribution of such stresses as will inevitably exist. The element 17 also must be and herein is made long enough to provide a safety factor permitting maximum recoil of the spring under abnormal conditions, that is, with the shock absorbers either removed, broken or not properly adjusted.

This proper length of the element 17 is here made attainable without materially reducing the ground clearance because of the construction of the attaching means 37. With variation in the length of the element 17, the length of the main portion 38 of the attaching means 37 may also be varied so that regardless of the length of the element 17 the point of connection between the elements 16 and 17 may always be so located as to prevent contact between the element 16 and the ends of the U-bolts 14 and at the same time not be disposed so low as to reduce the ground clearance even on full deflection of the spring under load. Whatever the relative length of element 17 and the portion 38 may be, portion 38 should always be somewhat shorter than the element 17. This assures, first, that the element 16 will be so spaced as not to be interfered with by the spring 13 or bolts 14, and, secondly, that the attaching means 37 will not interfere with the rivets 34 on the element 17.

In the normal, unattached position of the stabilizer, the elements 16 and 17 are, as previously stated, disposed at right angles to one another and the portion 38 of the attaching means 37 is substantially parallel with the element 17. When applied, the stabilizer as a whole is placed under a slight tension, though the element 16 is under compression, causing the element 16 to assume a very gradual S-curve. The element 17 is under tension but, due to the fact that element 16 is under compression in that position, is flexed so as to be very slightly concave when viewed from the right in Fig. 3. The condition of the stabilizer is readily seen from Fig. 3 and it is to be noted that the element 17 has been flexed slightly away from the portion 38 of the attaching means 37.

Under full deflection, the spring 13 assumes the position shown in Fig. 4. Under this condition, the element 17 is flexed to an even greater extent than shown in Fig. 3, but still has a very gradual curve so that no excessive or localized stresses are set up. The element 16 still has an S-curve which, however, is reversed from that in Fig. 3, because the free end of the stabilizer is now below the point of attachment of the element 16 to the attaching means 18. This curve also is still very gentle and thus does not set up any excessive or localized stresses. It is also to be noted that with the reversal in the S-curve the element 16 beneath the spring 13 curves away so as to prevent interference between the spring and element 16.

In Fig. 5, the stabilizer is shown in a position which it assumes under recoil of the spring 13. In this condition, the element 17 has a convex curvature, as viewed from the right in Fig. 5, so that the free point of the stabilizer has moved toward the axle 10 a considerable distance in compensation for the lengthening of the distance between the points of attachment due to the recoil of the spring. Preferably, the portion 38 has secured therein near the flange 41 a number of rubber nubs 45 which the element 17 contacts when given its convex bend. In extreme cases, the element 17 also very slightly contacts and bends about the corner formed between the flange 41 and the main portion 38 of the attaching means. The element 16 assumes an S-curve of somewhat sharper curvature than in either of the other two positions, but still so gentle as not to set up excessive stresses in elements having the extreme flexibility normal to their plane that the elements 16 and 17 have. It is also to be noted that the stress on the element 17 is primarily a tension pulling longitudinally of the element and thus not setting up any local and high bending stress. Element 16 now is also tensioned.

While the stabilizer has here been described as applied to the gear housing and the center of a transverse spring, necessitating but a single stabilizer, it is not to be forgotten that the stabilizer might be applied one at each side of the vehicle without departing from the invention. Under those circumstances, the elements 16 and 17 might be made narrower to effect a saving in material.

I claim as my invention:

1. A stabilizer for use with a vehicle having a chassis frame structure, an undercarriage structure and spring means interposed therebetween comprising a first sheet element, attaching means at one end of said element for rigid attachment to the undercarriage structure with said element disposed flatwise and extending generally longitudinally of the vehicle, a second sheet element rigid with the remaining end of said first element extending transversely thereof and disposed generally normal thereto, each of said elements being readily flexible in a direction normal to its plane but resisting bending moments in its plane, and attaching means at the remaining end of said second element for rigid attachment to the chassis frame structure providing an effective point of attachment of said second element above the actual point of engagement with the chassis frame structure.

2. A stabilizer for use with a vehicle having a chassis frame structure, an undercarriage structure and spring means interposed therebetween comprising a first sheet element, attaching means at one end of said element for rigid attachment to the undercarriage structure with said element disposed flatwise and extending generally longitudinally of the vehicle, a second sheet element rigid with the remaining end of said first element extending transversely thereof and disposed generally normal thereto, each of said elements being readily flexible in a direction normal to its plane but resisting bending moments in its plane, and attaching means at the remaining end of said second element for rigid attachment to the chassis frame structure providing a location for said remaining end of said second element above the point of attachment of said attaching means to the chassis frame structure.

3. A stabilizer for use with a vehicle having a chassis frame structure, an undercarriage structure and spring means interposed therebetween comprising a first sheet element, attaching means at one end of said element for rigid attachment to the undercarriage structure with said element disposed flatwise and extending generally longitudinally of the vehicle, a second sheet element rigid with the remaining end of said first element extending transversely thereof and disposed generally normal thereto, each of said elements being readily flexible in a direction normal to its plane but resisting bending moments in its plane, and attaching means at the remaining end of said second element for rigid attachment to the chassis frame structure having an upwardly extending portion, to which said second element is rigidly secured, to have the location of the remaining end of said second element spaced from the point of attachment of the attachment means to the chassis frame structure.

4. A stabilizer for use with a vehicle having a chassis frame structure, an undercarriage structure and spring means interposed therebetween comprising a first sheet element, attaching means at one end of said element for rigid attachment to the undercarriage structure with said element disposed flatwise and extending generally longitudinally of the vehicle, a second sheet element rigid with the remaining end of said first element extending transversely thereof and disposed generally normal thereto, each of said elements being readily flexible in a direction normal to its plane but resisting bending moments in its plane, and attaching means at the remaining end of said second element for rigid attachment to the chassis frame structure, said attaching means extending inwardly from the end of said second element toward said first element.

5. A stabilizer for use with a vehicle having a chassis frame structure, an undercarriage structure and spring means interposed therebetween comprising a first sheet element, attaching means at one end of said element for rigid attachment to the undercarriage structure with said element disposed flatwise and extending generally longitudinally of the vehicle, a second sheet element rigid with the remaining end of said first element extending transversely thereof and disposed generally normal thereto, each of said elements being readily flexible in a direction normal to its plane but resisting bending moments in its plane, and attaching means at the remaining end of said second element for rigid attachment to the chassis frame structure, said attaching means extending inwardly from the end of said second element but terminating short of said first element to provide clearance between said first element and the chassis frame structure when the stabilizer is attached.

6. A stabilizer for use with a vehicle having a chassis frame structure, an undercarriage structure and spring means interposed therebetween comprising a first sheet element, attaching means at one end of said element for rigid attachment to the undercarriage structure with said element disposed flatwise and extending generally longitudinally of the vehicle, a second sheet element rigid with the remaining end of said first element extending transversely thereof and disposed generally normal thereto, each of said elements being readily flexible in a direction normal to its plane but resisting bending moments in its plane, and attaching means at the remaining end of said second element for rigid attachment to the chassis frame structure comprising a rigid main portion extending inwardly from the end of said second element and generally parallel therewith and an attaching flange on the inner end of the main portion.

7. A stabilizer for use with a vehicle having a chassis frame structure, an undercarriage structure and spring means interposed therebetween comprising a first sheet element, attaching means at one end of said element for rigid attachment to the undercarriage structure with said element disposed flatwise and extending generally longitudinally of the vehicle, a second sheet element rigid with the remaining end of said first element extending transversely thereof and disposed generally normal thereto, each of said elements being readily flexible in a direction normal to its plane but resisting bending moments in its plane, said second element being of a length to compensate by flexure thereof for the major portion of the change in distance during flexing or recoil of the spring between the points of attachment of the stabilizer to the undercarriage and chassis structures, and attaching means for said second element positioning the remaining end of said second element above the point of attachment to the chassis frame structure to provide road clearance.

8. A stabilizer for use with a vehicle having a chassis frame structure, an undercarriage structure and spring means interposed therebetween comprising a first sheet element, attaching means at one end of said element for rigid attachment to the undercarriage structure with said element disposed flatwise and extending generally longitudinally of the vehicle, a second sheet element rigid with the remaining end of said first element extending transversely thereof and disposed generally normal thereto, each of said elements being readily flexible in a direction normal to its plane but resisting bending moments in its plane, said second element being of a length to compensate by flexure thereof for the major portion of the change in distance during flexing or recoil of the spring between the points of attachment of the stabilizer to the undercarriage and chassis structures, and attaching means for said second element including a portion secured to the remaining end of said second element and extending inwardly a predetermined distance less than the length of said second element.

9. A stabilizer, for use with a vehicle having an undercarriage structure including an axle, a chassis frame structure including a member extending transversely of the vehicle spaced longitudinally of the vehicle with respect to the axle, and spring means interposed between the structures comprising a first sheet element, attaching means at one end of said element for rigid attachment to the undercarriage structure with said element disposed flatwise and extending generally longitudinally of the vehicle toward the transverse member, a second sheet element rigid with the remaining end of said first element extending transversely thereof and disposed generally normal thereto, each of said elements being readily flexible in a direction normal to its plane but resisting bending moments in its plane, and attaching means at the remaining end of said second element including an extension parallel with and opposite a portion of said second element for attaching said second element to the transverse member to provide adequate road clearance while enabling said second element to be of sufficient length to provide the necessary flexibility.

10. A stabilizer, for use with a vehicle having an undercarriage structure including an axle, a chassis frame structure, spring means interposed between the structures, said spring means extending transversely of the vehicle spaced longitudinally of the vehicle with respect to the axle, and U-bolts for securing the spring to the chassis frame structure comprising a first sheet element, attaching means at one end of said element for rigid attachment to the undercarriage structure with said element disposed flatwise and extending generally longitudinally of the vehicle toward the transverse member, a second sheet element rigid with the remaining end of said first element extending transversely thereof and disposed generally normal thereto, each of said elements being readily flexible in a direction normal to its plane but resisting bending moments in its plane, and means for securing the remaining end of said second element to the chassis frame structure through the U-bolts while enabling said second element to have sufficient length to be flexible and yet not materially reduce the road clearance in any position of the spring when the stabilizer is applied.

11. A stabilizer for use with a vehicle having an undercarriage structure including an axle, a chassis frame structure, spring means interposed between the structures, said spring means extending transversely of the vehicle spaced longitudinally of the vehicle with respect to the axle, and U-bolts for securing the spring to the chassis frame structure comprising a first sheet element, attaching means at one end of said element for rigid attachment to the undercarriage structure with said element disposed flatwise and extending generally longitudinally of the vehicle toward the transverse member, a second sheet element rigid with the remaining end of said first element extending transversely thereof and disposed generally normal thereto, each of said elements being readily flexible in a direction normal to its plane but resisting bending moments in its plane, and attaching means for securing the stabilizer to the chassis frame structure through the U-bolts including a portion secured to the remaining end of said second element and extending inwardly therefrom to enable said first element to be positioned closely adjacent the bottom of the spring without shortening of said second element.

12. A stabilizer, for use with a vehicle having an undercarriage structure including an axle, a chassis frame structure, spring means interposed between the structures, said spring means extending transversely of the vehicle spaced longitudinally of the vehicle with respect to the axle, and U-bolts for securing the spring to the chassis frame structure comprising a first sheet element, attaching means at one end of said element for rigid attachment to the undercarriage structure with said element disposed flatwise and extending generally longitudinally of the vahicle toward the transverse member, a second sheet element rigid with the remaining end of said first element extending transversely thereof and disposed generally normal thereto, each of said elements being readily flexible in a direction normal to its plane but resisting bending moments in its plane, and attaching means for securing the stabilizer to the chassis frame structure through the U-bolts comprising a main portion secured to the remaining end of said second element and extending inwardly, said portion and said second element being proportionate to enable said second element to have a desired length giving the same flexibility without having the end thereof common with said first element disposed so far below the spring as to reduce road clearance, and a flanged portion apertured to receive the ends of the U-bolts.

13. A stabilizer for use with a body spring supported from a base structure comprising a first sheet element, attaching means at one end of said element for rigid attachment to the base structure with said element disposed flatwise and extending in a direction generally transversely of the direction of relative movement between the body and the base structure as to be reduced by the stabilizer, a second sheet element rigid with the remaining end of said first element extending transversely thereof and disposed generally normal thereto, each of said elements being readily flexible in a direction normal to its plane but resisting bending moments in its plane, and attaching means at the remaining end of said second element for rigid attachment to the body providing an effective point of attachment of said second element located beyond the actual point of engagement with the body as measured from said first element.

14. A stabilizer for use with a body spring supported from a base structure comprising a first sheet element, attaching means at one end of said element for rigid attachment to the base structure with said element disposed flatwise and extending in a direction generally transversely of the direction of relative movement between the body and the base structure as to be reduced by the stabilizer, a second sheet element rigid with the remaining end of said first element extending transversely thereof and disposed generally normal thereto, each of said elements being readily flexible in a direction normal to its plane but resisting bending moments in its plane, and attaching means at the remaining end of said second element for rigid attachment to the body having a portion to the end of which said second element is rigidly secured and extending inwardly from the end of said second element to have the location of the remaining end of said second element beyond the point of attachment of the attaching means to the body.

15. A stabilizer for use with a body spring supported from a base structure comprising a first sheet element, attaching means at one end of said element for rigid attachment to the base structure with said element disposed flatwise and extending in a direction generally transversely of the direction of relative movement between the body and the base structure as to be reduced by the stabilizer, a second sheet element rigid with the remaining end of said first element extending transversely thereof and disposed generally normal thereto, each of said elements being readily flexible in a direction normal to its plane but resisting bending moments in its plane, and attaching means at the remaining end of said second element for rigid attachment to the body comprising a rigid main portion extending inwardly from the end of said second element, and an attaching flange on the inner end of the main portion.

16. A stabilizer comprising a first sheet element, attaching means at one end of said element, a second sheet element rigid with the remaining end of said first element extending transversely thereof and disposed generally normal thereto, each of said elements being readily flexible in a direction normal to its plane but resisting bending moments in its plane, and attaching means at the remaining end of said second element providing an effective point of attachment of said second element spaced from said first element in the direction of said second element beyond the actual point of attachment of said attaching means.

17. A stabilizer comprising a first sheet element, attaching means at one end of said element, a second sheet element rigid with the remaining end of said first element extending transversely thereof and disposed generally normal thereto, each of said elements being readily flexible in a direction normal to its plane but resisting bending moments in its plane, and attaching means at the remaining end of said second element comprising a rigid main portion secured to the remaining end of said second element and extending inwardly therefrom, and an attaching portion at the inner end of said main portion rigid therewith.

18. A stabilizer comprising a first wide and thin spring element, attaching means at one end of said element, a separate second wide and thin element extending transversely of said first element at the remaining end thereof and disposed generally normal thereto, an angle bar rigidly interconnecting said elements, and attaching means at the remaining end of said second element comprising a rigid main portion secured to the remaining end of said second element and extending inwardly therefrom, and an attaching flange on the inner end of said main portion.

19. A stabilizer comprising a first wide and thin spring steel element, attaching means at one end of said element, a separate second wide and thin spring steel element extending transversely of said first element at the remaining end thereof and disposed generally normal thereto, an angle bar rigidly interconnecting said elements, and attaching means at the remaining end of said second element comprising a rigid main portion secured to the remaining end of said second element and extending inwardly therefrom, and an attaching flange on the inner end of said main portion.

EDWIN BAGNALL.